E. H. SHERBONDY.
TURBO COMPRESSOR MOUNTING.
APPLICATION FILED AUG. 1, 1918.
1,329,480.
Patented Feb. 3, 1920.
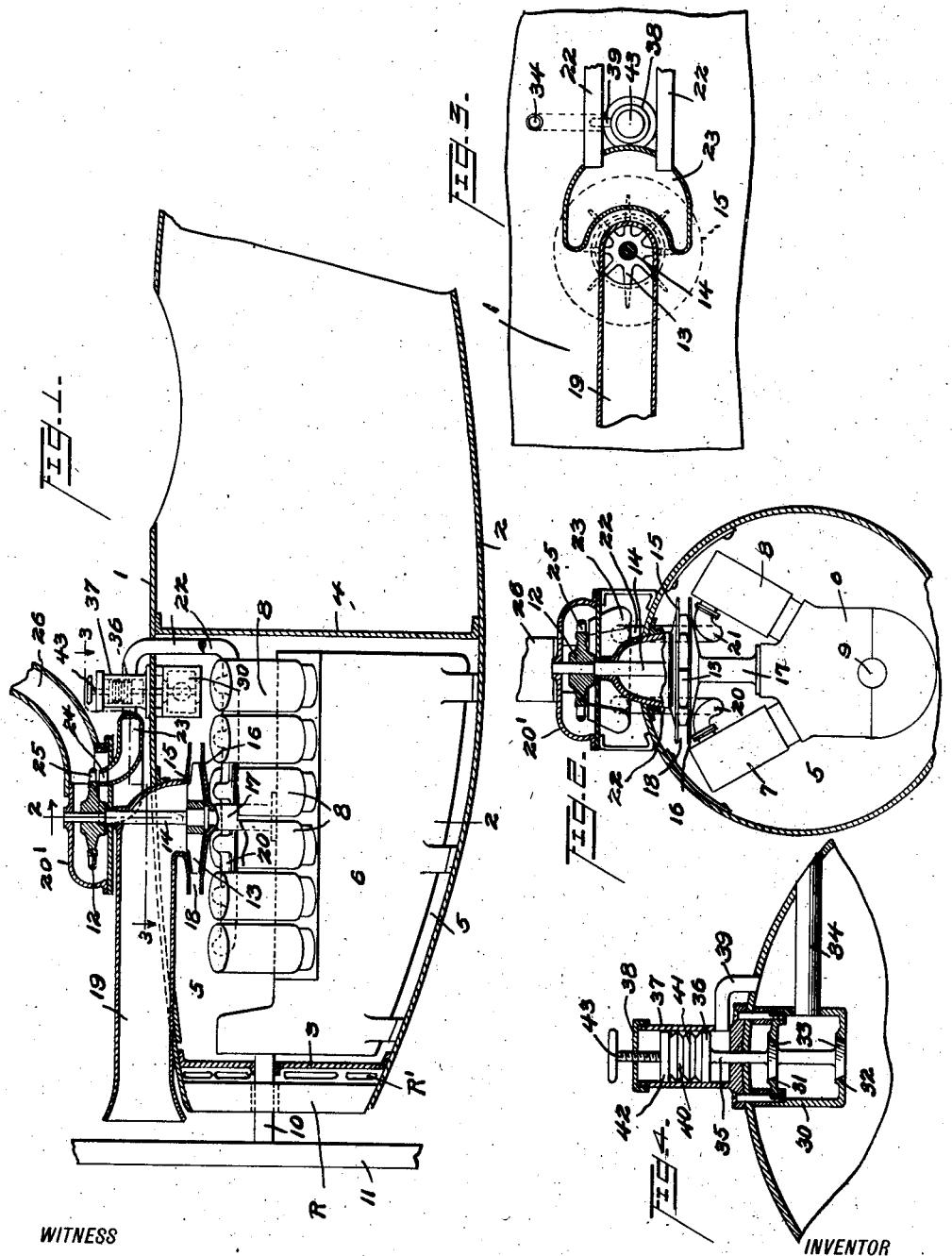
WITNESS
Harold Strauss
INVENTOR
Earl H. Sherbondy
BY
ATTORNEY

UNITED STATES PATENT OFFICE.

EARL H. SHERBONDY, OF CLEVELAND, OHIO.

TURBO-COMPRESSOR MOUNTING.

1,329,480.               Specification of Letters Patent.       Patented Feb. 3, 1920.

Application filed August 1, 1918. Serial No. 247,849.

*To all whom it may concern:*

Be it known that I, EARL H. SHERBONDY, a citizen of the United States, residing at Cleveland, in the county of Cuyahoga and State of Ohio, have invented certain new and useful Improvements in Turbo-Compressor Mountings, of which the following is a specification.

This invention relates to the positioning of a turbo-compressor unit in relation to the engine. The turbo-compressor unit comprises a turbine wheel, which is adapted to be operated by the exhaust gases from the engine and further comprises a centrifugal blower or compressor wheel, which is operated by the turbine, to supply air for combustion in the engine or for other purposes.

The unit is particularly intended for use on an airplane engine, in order to supply additional air to the engine to compensate for the rarefaction of the air at higher altitudes.

The device in a general way resembles that shown in my copending case Serial Number 224,356 filed March 23, 1918.

In this case the engine is located in an air tight compartment in the airplane fuselage. The compressor wheel is located within this compartment and discharges air directly into it. The turbine however, while on the same shaft as the compressor wheel, is located outside the fuselage.

The reason for separating the turbine from the compressor, is to avoid transmission of heat from the hot turbine wheel and hot turbine casing to the compressor wheel, and other structure adjacent thereto.

Another advantage of putting the turbine wheel outside the fuselage is that at best, there is very little room in the fuselage for the location of this element and by having the compressor wheel and casing inside the air tight compartment, the air is delivered from the compressor casing, directly to this compartment, simply by providing the casing with the necessary openings, no air delivery pipe being necessary.

As mentioned in my co-pending case at higher altitudes the oxygen content of the air is lower than at sea level, which results in a weaker mixture being drawn in the cylinder of the engine at each stroke with a corresponding diminution of power.

With this device however, where an extra amount of air is pumped to the engine, the engine power may be maintained substantially constant at any altitude.

Another feature of my invention is a safety valve, so arranged that when the air pressure in the compartment exceeds a certain amount, the excess is allowed to escape to the atmosphere.

Other objects and advantages will appear as the description proceeds.

In the drawings illustrating an embodiment of my invention, Figure 1, is a side view in section of the airplane engine in position in the fuselage, with the turbo-compressor mounted thereon; Fig. 2, is a section on the line 2—2 of Fig. 1; Fig. 3, is a section on the line 3—3 of Fig. 1 and Fig. 4, is a sectional view on an enlarged scale of the safety valve.

The airplane fuselage comprising top and bottom walls, 1 and 2, is provided with transverse partitions 3 and 4 spaced apart to form an air-tight engine compartment 5. Located within this compartment, is shown a V-type engine, the crank case thereof, being indicated at 6 and double rows of cylinders at 7 and 8.

The crank shaft 9 of the engine is geared to operate the propeller shaft 10 on which is mounted the propeller 11.

The turbo-compressor unit comprises a turbine wheel 12 and a centrifugal compressor wheel 13, both mounted on the vertically arranged shaft 14. Associated with compressor wheel 13, are casing elements 15 and 16, inclosing the said wheel and being spaced apart toward the periphery, so that the air being delivered by the wheel, passes directly into the compartment 5.

The shaft 14 turns in suitable bearings, supported by the standard 17, mounted on the crank case 6 of the engine.

It should be noted that wheel 13 is well within the fuselage 1 and that the air compressed thereby, passes through the openings 18, between the casing elements 15 and 16, directly to the compartment 5, without the necessity of any delivery pipes.

The air is led from the atmosphere to the wheel 13, through a pipe 19, which passes outside the fuselage and opens forwardly and faces in the direction of travel of the airplane. The pipe 19 also preferably is positioned facing into the propeller blast, whereby the ingress of air is aided, due to these two factors.

The turbine 12 is mounted in a suitable casing 20' on the outside of the fuselage and is adapted to be operated by the exhaust gases from the engine to drive the wheel 13. The exhaust manifolds 20 and 21 are connected to pipes 22, which lead the exhaust gases to a chamber 23, which delivers these gases through one or more nozzles, located at 24 on to the buckets 25 of the turbine. After passing through the buckets the gases escape to the atmosphere through the pipe 26.

Referring now to Fig. 4, there is shown valve means to allow excess air pressure to escape from the compartment 5.

Located within the fuselage is a casing 30, which has two valve seats, 31 and 32, in which are located the valve heads 33 of a balanced valve. The interior of the casing 30 is opened to the atmosphere through pipe 34.

The valve stem 35 carries a piston 36, which moves in a cylinder 37, hermetically sealed by a cap 38. The lower part of the cylinder 37, is in communication with the compartment 5, through a pipe 39 and the upper side of a piston 36 may be loaded in any suitable way, as by spring, or as shown here by a body of air 40 inclosed within a bellows 41.

The pressure of this body of air 40, may be varied by moving a piston 42, up and down to expand or contract the bellows, this movement being effected through the threaded handle 43.

It should be noted that an ordinary safety valve would not be desirable in this connection, because it would be affected by variations in the external atmospheric pressure. By providing, however, a body of air 40, sealed up tightly in a casing, a valve is provided which operates quite independently of such variations in the atmospheric pressure.

A spring inclosed in an air tight casing, could be used to load the piston 36 if desired. By moving the piston 42, up and down, it will be apparent that the valve may be caused to blow off at any point desired.

The radiator "R" for the engine may be positioned just in front of the partition 3, the air after leaving the radiator escaping through the slots R'.

While I have illustrated a possible embodiment of my invention it should be understood that it may be carried out in other ways as defined within the scope of the following claims.

I claim:

1. In combination with an engine compartment, an internal combustion engine therein; means to compress air located within said compartment, means, adapted to be operated by the exhaust gases from the engine, to drive said air compressing means, said second mentioned means being located outside of the engine compartment and means to supply atmospheric air to the air compressor.

2. In combination with an internal combustion engine, a compartment for said engine, a turbine adapted to be operated by the exhaust gases from the engine positioned outside of said compartment, an air compressor operated by said turbine, positioned within said compartment, to supply air for combustion in the engine and means to supply atmospheric air to the air compressor.

3. In combination with an airplane fuselage, an engine compartment, an internal combustion engine therein; an air compressor positioned within said compartment, means, operated by the exhaust gases from the engine to operate said air compressor, said means being positioned without said compartment and means to supply atmospheric air to the air compressor.

4. The combination as claimed in claim 3, said last mentioned means, facing in the direction of travel of the airplane.

5. The combination as claimed in claim 3, said last mentioned means, facing in the propeller blast.

6. The combination as claimed in claim 3, in combination with means to allow the escape of air from the said engine compartment, when the air pressure therein, exceeds a certain amount.

7. The combination as claimed in claim 3, in combination with valve means to allow the escape of air from the said compartment when the air pressure exceeds a certain amount, said valve means being so constructed as to be unaffected by variation in the external atmospheric pressure.

8. In combination with an airplane fuselage, an engine compartment, an internal combustion engine therein, an air compressor located within said compartment, a turbine mounted on the same shaft with said air compressor and positioned on the outside of said compartment, means to lead exhaust gas from the engine to said turbine and means to lead atmospheric air to the air compressor.

In testimony whereof I affix my signature.

EARL H. SHERBONDY.